United States Patent [19]

Holton, Sr.

[11] 4,359,870

[45] Nov. 23, 1982

[54] APPARATUS FOR PRODUCING ELECTRICITY FROM SOLAR ENERGY

[76] Inventor: Aldon E. Holton, Sr., Rte. 2, Box 140, Floral City, Fla. 32636

[21] Appl. No.: 351,899

[22] Filed: Feb. 24, 1982

[51] Int. Cl.³ .............................................. F03G 7/02
[52] U.S. Cl. .................................. 60/641.12; 60/698
[58] Field of Search ................. 60/641.11, 641.12, 698

[56] References Cited

U.S. PATENT DOCUMENTS

| | | | |
|---|---|---|---|
| 401,516 | 4/1889 | Robb | 60/641.12 |
| 3,048,006 | 8/1962 | Goodman | 60/641.12 |
| 3,436,908 | 4/1969 | Van Delic | 60/641.11 |
| 3,894,393 | 7/1975 | Carlson | 60/641.11 |
| 4,033,126 | 7/1977 | Newland | 60/398 |

*Primary Examiner*—Allen M. Ostrager

*Attorney, Agent, or Firm*—Duckworth, Allen, Dyer & Pettis

[57] ABSTRACT

This invention is concerned with an apparatus of potentially large size for producing electrical energy from the rays of the sun. The apparatus utilizes an air housing mounted on a hillside exposed to sunlight. The air housing, having a roof of light admitting panels, causes air to be heated and transported upwardly in a convergent manner to an apex opening which communicates with a tunnel. A bladed member mounted within the tunnel and rotated by the flow of air therein activates an electrical generator. The exit extremity of the tunnel communicates with a collector chamber which in turn communicates with a vertically oriented chimney stack which intensifies the velocity of air passing through the tunnel.

6 Claims, 5 Drawing Figures

APPARATUS FOR PRODUCING ELECTRICITY FROM SOLAR ENERGY

BACKGROUND OF THE INVENTION

This invention concerns a solar energy apparatus of variable dimensions intended to serve the energy needs of a multitude of users such as a large single building or a community of residential and/or industrial buildings or facilities.

A number of basic approaches have been explored for deriving useful energy from the sun's radiations. One such approach involves the creation of an upward flow of air in a confining conduit, and causing the flow to rotate a mechanism which provides torque energy capable of operating an electrical generator. The upward flow of air is created by causing the sun's rays to heat air in a substantially confined system, whereby the heated air rises convectively from the more dense colder air continuous therewith and awaiting heating. Specific systems of such general nature are disclosed for example in U.S. Pat. Nos. 4,244,189; 4,096,698; 4,033,128; and 3,048,006.

Improvement in the general efficiencies of the prior systems is desirable. It is particularly important that such systems be designed and constructed at a cost which would be feasible in view of their lifetime energy output and the practicality of utilization of said energy output.

It is accordingly an object of the present invention to provide an apparatus capable of large size construction for converting the sun's rays into useful energy.

It is another object of this invention to provide apparatus of the aforesaid nature which enables the sun's rays to generate a flow of air in a confining conduit.

It is a further object of the invention to provide apparatus of the aforesaid nature wherein said flow of air efficiently activates a turbogenerator which produces electricity.

It is still another object of the invention to provide apparatus of the aforesaid nature which utilizes factors of size, geographical disposition, and naturally prevailing free wind currrents to enhance the efficiency of the apparatus.

These objects and other objects and advantages of the invention will be apparent from the following description.

SUMMARY OF THE INVENTION

The above and other beneficial objects and advantages are accomplished in accordance with the present invention by an improved large scale energy apparatus which comprises a large upwardly convergent air housing located on a hillside or ridge slope and functioning as a hothouse type of solar heat collecting field. The air housing is comprised of a flooring which is painted black, or otherwise adapted to absorb the rays of the sun. The roof of the air housing is comprised of flat polygonal panels of shatterproof glass strong enough to withstand the weight of snow, ice, hail and rain. The panels are provided with electrical heating wires capable of melting ice and snow. The roof of the air housing is secured to the flooring by thin steel I beam struts which may also have a black coating to generate heat. The abutting straight edges of the panels are sealed together with heat and weather resistant silicone rubber caulking compound or equivalents thereof to prevent leakage of water or air. The flooring is anchored to the underlying ground in very close adjacency thereto and in fact may consist of concrete having been poured into molds on a shaped hillside. The overall shape of the air housing is triangular, with the apex rising 20 to 60 feet above the base.

The air housing is adapted to: (a) receive ambient air from an inlet opening of large cross-sectional area adjacent its lower, base extremity, (b) cause said air to be heated by energy derived from the rays of the sun, and (c) deliver said heated air to an apex exit opening positioned above said inlet opening. The apex opening communicates in airtight manner with the upstream or entrance extremity of an elongated wind tunnel. The downstream or exit extremity of said tunnel communicates with a collector chamber. A bladed device such as a wind turbine is rotatively mounted within said tunnel in a manner to be activated by the flow of air in the tunnel, said bladed device being mechanically coupled to an electric generator. A vertical funnel-shaped chimney stack communicates with said collector chamber to enhance the velocity of air passing through the tunnel.

The air housing is positioned in a stationary manner on a hillside or ridge slope having a slope of between about 5° and 60°. The ridge slope or hillside is preferably oriented in a manner such that it receives sunlight most of the day. In the northern hemisphere of the Earth, for example, the hillside would preferably face the south. The transparent roof panels may be of any number and size and interconnected to form a unified assemblage which provides the effect of essentially one large roof, forming a triangular greenhouse type of enclosure. The distance of separation between the roof panels and flooring may range between about 2 and 24 inches, said distance of separation preferably being smaller adjacent the base of the air housing, whereby a tapered effect is produced in the thickness of the air housing. The larger distances of separation are utilized in the large scale versions of the apparatus. The outer perimeter of each panel is polygonal, thereby facilitating abutment and attachment with contiguous panels to form a unified roof assemblage.

The width of the air housing narrows as it ascends, thereby providing a laterally tapering or convergent funneling effect leading to a relatively narrow apex exit which fits the upstream extremity of the aforesaid wind tunnel. The lowermost or baseline extremity of the air housing admits ambient air which then proceeds unimpededly upward through the air housing. The two convergent sides of the air housing are closed toward escape of air. Baffle structures, which may be black and perforated, may be utilized within the air housing to increase the amount of heat which can be absorbed from the sun's rays and transferred to the air. However, such baffle structures should not significantly impede the flow of air. The air housing causes the air confined therein to be heated. The heated air moves upwardly as colder, more dense air enters the lowermost extremity. As the air rises in the housing, it acquires greater velocity because of the laterally convergent funneling effect, and the expanded volume of the heated air.

The velocity of the air transferred from the air housing into the tunnel is further accelerated by the aforesaid collector chamber and funnel-shaped vertical stack which permit controlled expansion of the airstream with consequently intensified upward draft and resultant suction effect upon the following airstream. To further enhance the suction effect applied to the air in the tunnel, a horizontally disposed propeller blade may be contained within the upper extremity of the stack. Said propeller can be made to rotate by ambient winds acting upon an outside windmill in a manner to augment the upward movement of air in the stack.

The collector chamber is preferably of a spherical configuration. In addition to its function of redirecting the air flow from horizontal to vertical, it may serve to accommodate more than one tunnel communicating with a single stack.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
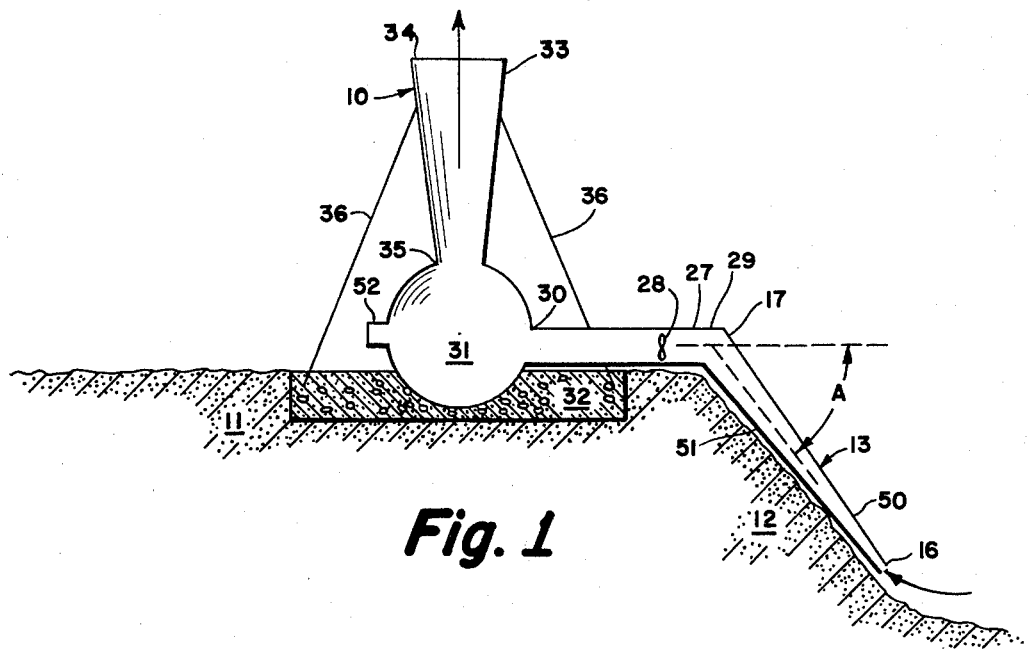
FIG. 1 is a schematic side view of an embodiment of the solar energy system of the present invention.
Figure 2:
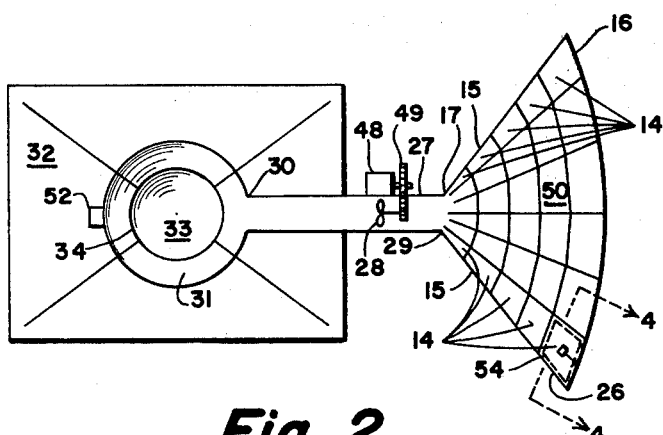
FIG. 2 is a top view of the embodiment of FIG. 1.

Referring to FIGS. 1 and 2, a solar energy system 10 of the present invention is shown positioned partly upon a plateau 11 and contiguous hillside 12. An air housing 13 having a poured concrete floor 51 and roof 50 comprised of a multitude of interengaged panels 14 is supported by hillside 12. Air housing 13 has a generally triangular perimeter configuration comprised of opposed side boundaries 15, base perimeter 16, and apex opening 17.

Figure 4:
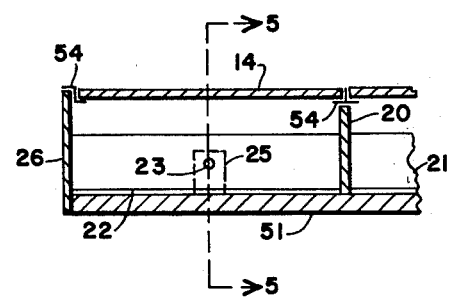
FIG. 4 is an enlarged sectional view of a lower portion of the air housing taken along the line 4—4 of FIG. 2.
Figure 5:
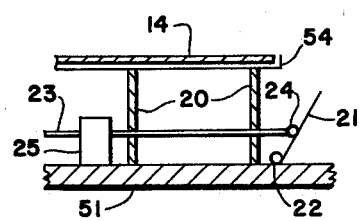
FIG. 5 is a sectional view taken on the line 5—5 of FIG. 4.

Each roof panel is substantially flat and reasonably transparent to the rays of the sun, yet impervious toward air. The panels may be fabricated of thin sheet material such as glass, polyacrylate, polycarbonate, or film materials such as polyester and polyethylene. It is important however that the panels be fabricated of materials resistant to degradation by sunlight and strong enough to withstand the impact of rainwater and possibly hailstones. To achieve optimum performance, said panels may in fact be layered composites of two or more materials. The roof panels are held fixedly above floor 51 by frames 54 supported by structural means having the form of thin, rigid struts 20 shown in FIGS. 4 and 5. The separate panels may be bonded to the frames or otherwise interconnected by resilient bonding or caulking agents well known in the art.

Adjustable closure means in the form of doors 21 connected by pivot means 22 to floor 51 are associated with each panel adjacent base perimeter 16. A control rod 23 attached to door 21 by pivot means 24 extends to engagement with motorized means 25 capable of moving said control rod toward or away from door 21. In such manner, the amount of air which enters base perimeter 16 can be controlled. The path taken by the air entering said base perimeter is indicated by an arrow in FIG. 1.

Confinement of air within said air housing is achieved by the enclosing effect provided by the assembled roof panels, the floor, and side panels 26 which extend perpendicularly between the roof panels and floor 51 adjacent side boundaries 15. The overall contour of the air housing may be flat, or it may be downwardly curved to conform with the contour of the underlying supporting hillside. The base perimeter 16 may be curved or straight.

The apex of said assemblage communicates in airtight manner with the upstream or entrance extremity 29 of tunnel 27 at an angle A, shown in FIG. 1, greater than 5°, and preferably between 15° and 60°. The cross-sectional area of the tunnel is such that the volume of air entering said tunnel from the air housing is caused to accelerate in velocity. Accordingly, it is preferred that the cross-sectional area of the tunnel be smaller than the total open area of the base of the air housing.

Positioned within tunnel 27 is an axially positioned bladed structure 28 which is caused to rotate by the air passing through said tunnel. The extremities of bladed structure 28 extend to close-fitting engagement with the interior wall of the tunnel, thereby eliminating the possibility that air will pass around the bladed structure without interacting with it. The bladed structure is coupled by mechanical means 49 to an armature of a standard generator apparatus 48 which produces electricity.

The exit or downstream extremity 30 of tunnel 27 communicates in an airtight manner with spherical collector chamber 31 positioned in concrete support foundation 32. A vertically directed chimney stack 33 of circular cross section emerges from an airtight coupling 35 at the top of the collector chamber in an orientation such that the longitudinal axes of the stack and the tunnel intersect at substantially a right angle. The stack is outwardly flared in the direction of its ascent, whereby the diameter of its upper opening 34 is between 1.5 and 5.0 times the diameter of coupling 35. The height of the stack is 3 to 5 times the diameter of the top of the stack. Rigid supporting braces 36 are attached at an upper region of stack 33 and extend downwardly to anchored positions within foundation 32.

Figure 3:
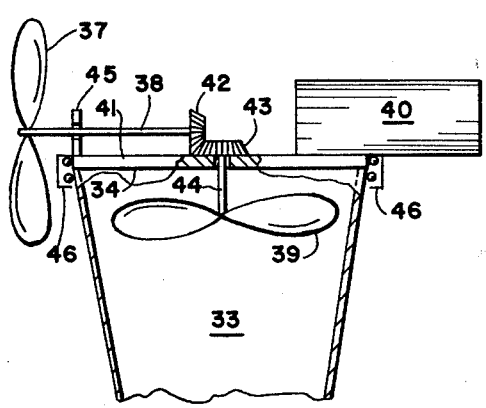
FIG. 3 is an enlarged side view of a preferred embodiment of the upper structure of the stack of FIGS. 1 and 2, portions being broken away to reveal interior details.

In the preferred embodiment illustrated in FIG. 3, there is mounted atop stack 33 an ambient wind activated mechanism comprised of a vertically disposed propeller 37, horizontally disposed propeller 39, and vane 40 mounted upon a frame 41 adapted to freely rotate about the upper extremity 34 of said stack. The vertical propeller 37 is coupled to horizontal propeller 39 by horizontal shaft 38 terminating in upper bevel gear 42 which engages lower bevel gear 43 attached to vertical shaft 44 supporting propeller 39. Shaft 44 is journalled to a cross piece associated with frame 41. Likewise, shaft 38 is journalled to post 45 attached to the outer perimeter of frame 41. Roller harnesses 46 enable the ambient wind mechanism to ride freely around the perimeter of upper extremity 34, while maintaining an enclasping force against the sidewall adjacent said extremity to ensure smooth rotation about the center axis. The effect of the ambient wind activated mechanism is to cause ambient winds to exert further upward draft on the air in the stack, thereby increasing its velocity in the tunnel where it acts upon the bladed member.

In those embodiments of the apparatus of this invention wherein more than one air housing and associated tunnel feed into one collector chamber, the spaces between said tunnels may be utilized for maintenance facilities, access roads, and supportive equipment and supplies. The electricity generated by the apparatus may be either conveyed to distant places by conventional electrical conductors, or utilized adjacent the site of the apparatus for producing useful work or conversion to other energy forms such as hydrogen via electrolysis of water.

In order to maintain continuity of electrical supply on those days when insufficient sunlight strikes the roof of the air housing, an auxiliary fuel burner 52 may be associated with collector chamber 31. Said burner may utilize combustible natural gas, oil or hydrogen previously generated by the apparatus and stored for subsequent use.

Means of conventional design may be associated with the stack and collector chamber for the collecting, ducting and disposal of rainwater.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. An apparatus for producing electrical energy from sunlight comprising:
    (a) an upwardly convergent air housing having a floor and a roof comprised of interengaged flat panels capable of transmitting sunlight, said housing positioned on a hillside exposed to sunlight and causing air therein to be heated and directed upwardly to an apex opening,
    (b) at least one elongated tunnel positioned above said air housing and having opposed entrance and exit extremities, said entrance extremity being coupled in airtight manner to said apex opening,
    (c) a bladed structure rotatively mounted within said tunnel and mechanically coupled to an electrical generator,
    (d) a collector chamber coupled in airtight manner to the exit extremity of said tunnel, and
    (e) a chimney stack communicating with said collector chamber and vertically oriented in a manner such that the longitudinal center axes of said stack and tunnel intersect at a substantially right angle.

2. The apparatus of claim 1 wherein said air housing has a substantially triangular periphery, the base of said periphery being disposed below said apex and serving as an air inlet.

3. The apparatus of claim 2 wherein said chimney stack is designed to have increased diameter as it ascends.

4. The apparatus of claim 3 wherein a propeller device is mounted for horizontal rotation within said stack adjacent the upper extremity thereof, said propeller being driven by means acted upon by ambient wind currents and serving to augment the upward flow of air in said stack.

5. The apparatus of claim 1 wherein said floor is provided with a black coating which efficiently converts sunlight impinging thereupon into heat.

6. The apparatus of claim 2 wherein said base periphery which serves as an air inlet is provided with adjustable closure means for controlling the amount of air which enters said base periphery.

* * * * *